US 8,046,576 B2

(12) United States Patent
Zimmer et al.

(10) Patent No.: US 8,046,576 B2
(45) Date of Patent: *Oct. 25, 2011

(54) OFFLOADING THE PROCESSING OF A NETWORK PROTOCOL STACK

(75) Inventors: Vincent J. Zimmer, Federal Way, WA (US); Michael A. Rothman, Puyallup, WA (US)

(73) Assignee: Intel Corporation, Santa Clara, CA (US)

(*) Notice: Subject to any disclaimer, the term of this patent is extended or adjusted under 35 U.S.C. 154(b) by 564 days.

This patent is subject to a terminal disclaimer.

(21) Appl. No.: 12/199,362

(22) Filed: Aug. 27, 2008

(65) Prior Publication Data

US 2008/0313449 A1 Dec. 18, 2008

Related U.S. Application Data

(63) Continuation of application No. 11/173,069, filed on Jun. 30, 2005, now Pat. No. 7,441,112.

(51) Int. Cl.
*G06F 9/00* (2006.01)
*G06F 15/167* (2006.01)
*G06F 15/177* (2006.01)

(52) U.S. Cl. ............... 713/2; 713/1; 713/100; 709/214; 709/215; 709/217; 709/218; 712/13

(58) Field of Classification Search ............ 713/1, 2, 713/100; 712/13; 709/215, 214, 217, 218
See application file for complete search history.

(56) References Cited

U.S. PATENT DOCUMENTS

| | | | |
|---|---|---|---|
| 6,985,951 B2 | 1/2006 | Kubala et al. | |
| 7,424,710 B1 * | 9/2008 | Nelson et al. | 718/1 |
| 7,533,176 B2 * | 5/2009 | Freimuth et al. | 709/227 |
| 7,689,702 B1 * | 3/2010 | Tripathi et al. | 709/230 |
| 2003/0037178 A1 | 2/2003 | Vessey et al. | |
| 2004/0181647 A1 | 9/2004 | DeSota et al. | |
| 2006/0080523 A1 * | 4/2006 | Cepulis | 713/100 |
| 2007/0011272 A1 | 1/2007 | Bakke et al. | |
| 2007/0067435 A1 | 3/2007 | Landis et al. | |

OTHER PUBLICATIONS

Intel Corporation, "MultiProcessor Specification, Version 1.4", May 1997.
Rangarajan, Murali et al., "TCP Servers: Offloading TCP Processing in Internet Servers. Design, Implementation, and Performance", Rutgers University Technical Report, DCS-TR-481, Mar. 2002, pp. 1-14.
Yeh, Eric et al., "Introduction to TCP/IP Offload Engine (TOE), Version 1.0", 10 Gigabit Ethernet Alliance, Apr. 2002.
Cluster File Systems, Inc., "Lustre: A Scalable, High-Performance File System", Nov. 11, 2002, pp. 1-13.

(Continued)

*Primary Examiner* — Thomas Lee
*Assistant Examiner* — Fahmida Rahman
(74) *Attorney, Agent, or Firm* — Blakely, Sokoloff, Taylor & Zafman LLP

(57) ABSTRACT

A computer system is partitioned during a pre-boot phase of the computer system between a first partition and a second partition, wherein the first partition to include a first processing unit and the second partition to include a second processing unit. An Input/Output (I/O) operating system is booted on the first partition. A general purpose operating system is booted on the second partition. Network transactions are issued by the general purpose operating system to be performed by the I/O operating system. The network transactions are performed by the I/O operating system.

21 Claims, 8 Drawing Sheets

OTHER PUBLICATIONS

Romanow, Allyn, "An Overview of RDMA over IP", Cisco Systems White Paper, Dec. 2002, pp. 1-22.

Hypertransport Technology Consortium, "HyperTransport™ I/O Link Specification, Revision 1.10", Aug. 25, 2003, pp. 1-330.

Regnier, Greg et al. "ETA: Experience with an Intel® Xeon™ Processor as a Packet Processing Engine", IEEE Micro, vol. 24, No. 1, Jan./Feb. 2004, pp. 24-31.

Hypertransport Technology Consortium, "HyperTransport™ I/O Technology Overview: An Optimized, Low-latency Board-level Architecture", HyperTransport™ Consortium White Paper HTC_WP02, Jun. 2004, pp. 1-23.

Hypertransport Technology Consortium, "HyperTransport™ I/O Technology DirectPacket™ Specification: Efficient User Packet Handling Supports Streaming Communications", HyperTransport™ Consortium White Paper HTC_WP03, Jun. 2004, pp. 1-20.

Schmidt, Douglas et al., "Operating System Performance in Support of Real-time Middleware", Proceedings of the Seventh International Workshop on Object-Oriented Real-Time Dependable Systems (Words 2002), 2002 IEEE.

* cited by examiner

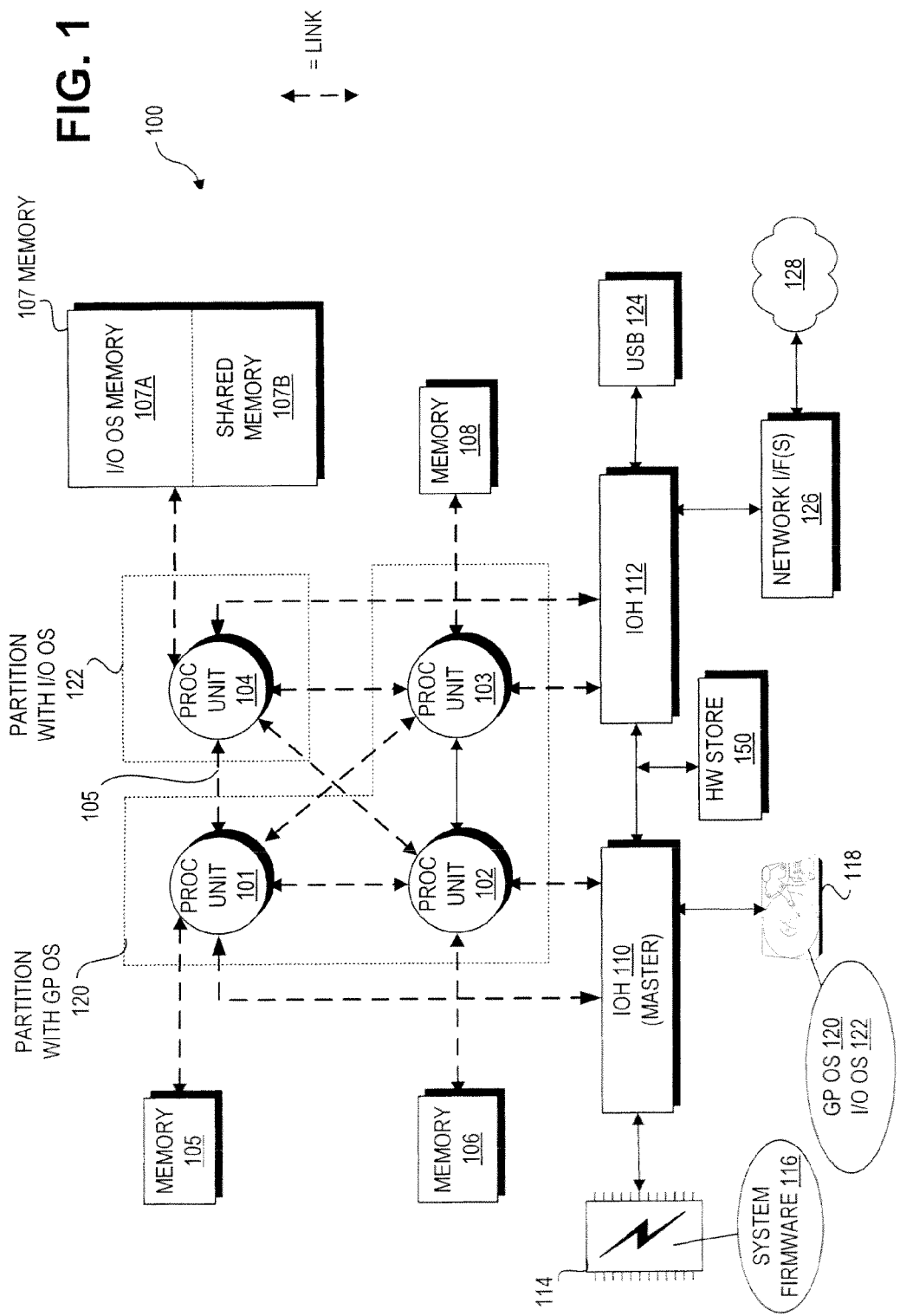

OFFLOADING THE PROCESSING OF A NETWORK PROTOCOL STACK

CROSS REFERENCE TO RELATED APPLICATIONS

The instant application is a continuation application of, and claims priority under 35 USC §120 to, U.S. patent application Ser. No. 11/173,069, filed Jun. 30, 2005, now U.S. Pat. No. 7,441,112.

BACKGROUND

1. Field

Embodiments of the invention relate to the field of computer systems and more specifically, but not exclusively, to offloading the processing of a network protocol stack.

2. Background Information

In typical computer architecture, the initialization and configuration of the computer system by firmware, such as the system Basic Input/Output System (BIOS), is commonly referred to as the pre-boot phase. The pre-boot phase is generally defined as the time between a processor reset and loading of an Operating System (OS). At the start of pre-boot, it is up to the code in the firmware to initialize the platform to the point that an operating system may be loaded off of media, such as a hard disk.

The start of the OS load begins the period commonly referred to as OS runtime. During OS runtime, the firmware may act as an interface between software and hardware components of a computer system as well as handle system-related tasks. As computer systems have become more sophisticated, the operational environment between the OS level and the hardware level is generally referred to as the system firmware.

The processing of a network protocol stack, such as a TCP/IP (Transmission Control Protocol/Internet Protocol) stack, may consume much of the processing power of a Central Processing Unit (CPU). The processing of the network protocol stack by the CPU reduces the processing speed of other applications by the CPU. This situation can be exasperated in a server system that may have to process numerous network transactions concurrently.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a block diagram illustrating a computer system in accordance with one embodiment of the present invention.

DETAILED DESCRIPTION

Figure 2A:
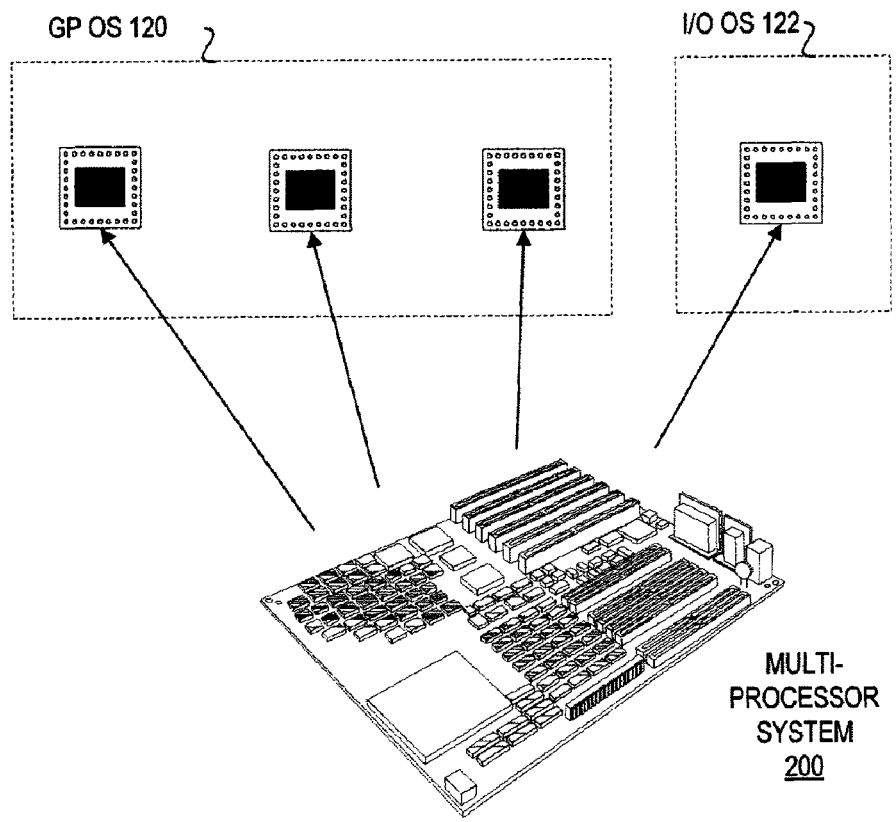
FIG. 2A is a diagram illustrating a multi-processor system in accordance with one embodiment of the present invention.

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Referring to FIG. 1, an architecture of a computer system 100 in accordance with embodiments of the invention is shown. It will be appreciated that embodiments of the invention are not limited to the architecture as shown in FIG. 1. Further details regarding computer system 100 are discussed at the end of this specification.

Computer system 100 includes processing units 101, 102, 103 and 104. Processing units 101-104 are coupled by links. For example, processing unit 101 is coupled to processing unit 104 by link 105. Links are shown in FIG. 1 by a heavy dotted-line.

The links provide a point-to-point interconnection between two endpoints, also referred to as nodes. In one embodiment, a link includes two uni-directional physical connections that transmit information serially. In another embodiment, commands and/or data are transported across a link in the form of packets. Embodiments of a link architecture include, but are not limited to, a HyperTransport™ Technology as promulgated by the HyperTransport Consortium and a Common System Interface (CSI) as promulgated by the Intel® Corporation. Embodiments of link architecture will be discussed further below.

In one embodiment, each processing unit 101-104 is coupled to a corresponding memory 105-108, respectively. In one embodiment, each memory 105-108 is coupled to processing units 101-104, respectively, by a link. In one embodiment, each processing unit 101-104 includes a memory controller.

In one embodiment, each processing unit 101-104 has access to the memory 105-108 of all the other processing units. In this particular embodiment, memory is presented to an operating system as a single virtual block. However, this single virtual block may map to various physical memory 105-108.

Memory 107 is divided into an I/O OS memory 107A and a shared memory 107B. As will be described in further detail below, shared memory 107B is shared by processing units 101-104 for conducting network transactions. Shared memory 107B may serve as a "mailbox" for passing commands and data between a General Purpose (GP) OS and an Input/Output (I/O) OS. I/O OS memory 107A is hidden from the General Purpose OS and is sequestered for use only by processing unit 104 or other processing units partitioned for network protocol stack processing. Similarly, memory 105, 106 and 108 are partitioned for use by the GP OS.

In an alternative embodiment, a hardware storage 150, such as buffers or registers, may serve as the "mailbox" between partitions instead of shared system memory. The GP OS and I/O OS may make read and write calls to the hardware storage for passing network activity, where the hardware storage is mapped as memory mapped I/O. In one embodiment, this hardware storage is part of a chipset that is mounted to a board, where the board includes sockets for the processing units and system memory.

In one embodiment, this hardware storage may be referred to as a hardware FIFO (First-In First-Out). In one embodiment, the chipset may include hardware FIFOs where each one may store up to several hundreds of bytes. Thus, a single Ethernet frame (maximum of approximately 1500 bytes) may be passed using hardware FIFOs. In another embodiment, hardware FIFOs may be interrupt driven such that an interrupt is issued to a processing unit when data is available to be read in the hardware FIFO or there is space in the FIFO to post or send data. As such, the GP OS and I/O OS may be able to act in a high-performance, reactive fashion.

Processing units 101 and 102 are coupled to an Input/Output Hub (IOH) 110 by links, and processing units 103 and 104 are each coupled to an IOH 112 by links. In the embodiment of FIG. 1, IOH 110 serves as the master IOH.

Various devices may be coupled to IOH 110 and 112. In computer system 100, a non-volatile storage (NVS) 114, such as Flash memory, may be coupled to IOH 110. NVS 114 may have stored system firmware 116.

Embodiments of the system firmware 116 described herein may be implemented substantially in compliance with the Extensible Firmware Interface (EFI) (*Extensible Firmware Interface Specification*, Version 1.10, Dec. 1, 2002, available at http://developer.intel.com/technology/efi.) EFI enables firmware, in the form of firmware modules, such as drivers, to be loaded from a variety of different resources, including flash memory devices, option ROMs (Read-Only Memory), other storage devices, such as hard disks, CD-ROM (Compact Disk-Read Only Memory), or from one or more computer systems over a computer network. One embodiment of an implementation of the EFI specification is described in the *Intel® Platform Innovation Framework for EFI Architecture Specification—Draft for Review*, Version 0.9, Sep. 16, 2003," (available at www.intel.com/technology/framework). It will be understood that embodiments of the present invention are not limited to the "Framework" or implementations in compliance with the EFI specification.

A storage device 118, such as a hard disk drive, is also coupled to IOH 110 and has stored instructions for a General Purpose operating system 120 and an I/O operating system 122. As shown in FIG. 1, processing units 101-103 are designated to execute General Purpose OS 120 in one partition and processing unit 104 is designated to execute I/O OS 122 in another partition. Embodiments of general purpose OS 120 include Microsoft® Windows, Unix, Linux, Apple® Mac OS, or the like. Embodiments of I/O OS 122 may include a "lightweight" OS to support I/O tasking. Embodiments of I/O OS 122 may include a real-time operating system (RTOS), such as VxWorks. In other embodiments, I/O OS 122 may include a Berkeley Software Distribution (BSD) Unix OS, or the like.

IOH 112 is coupled to Universal Serial Bus (USB) ports 124 and one or more network interfaces 126. Network interfaces 126 may send and receive communications over network 128.

Embodiments of the invention provide for designating a processing unit of a system to handle network protocol processing of a system. In one embodiment, the system is partitioned so that one or more processing units support General Purpose OS 120 and one or more processing units support I/O OS 122. While embodiments herein are discussed in conjunction with a system having four processing units, it will be appreciated that embodiments herein may be used on a system having greater or fewer than four processing units. In one embodiment, a processing unit may support multi-threading.

As shown in FIG. 2A, embodiments of the invention may be implemented on a multi-processor system 200, where a processing unit includes a processor. In one embodiment, multi-processor system 200 is a Symmetric Multiprocessor system wherein one copy of a particular OS resides in memory, but any processor may run the OS. In another embodiment, system 200 includes a server deployed to handle high amounts of network traffic.

Figure 2B:
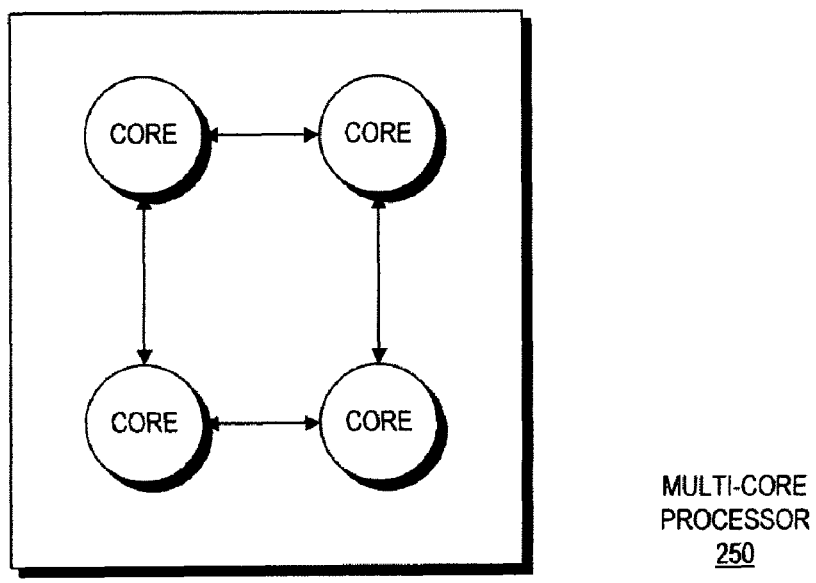
FIG. 2B is a block diagram illustrating a multi-core processor in accordance with one embodiment of the present invention.

As shown in FIG. 2B, embodiments of the invention may be implemented on a multi-core processor 250, where a processing unit includes a processor core. Embodiments of multi-core processor 250 include a processor having symmetric cores or asymmetric cores.

Figure 3:
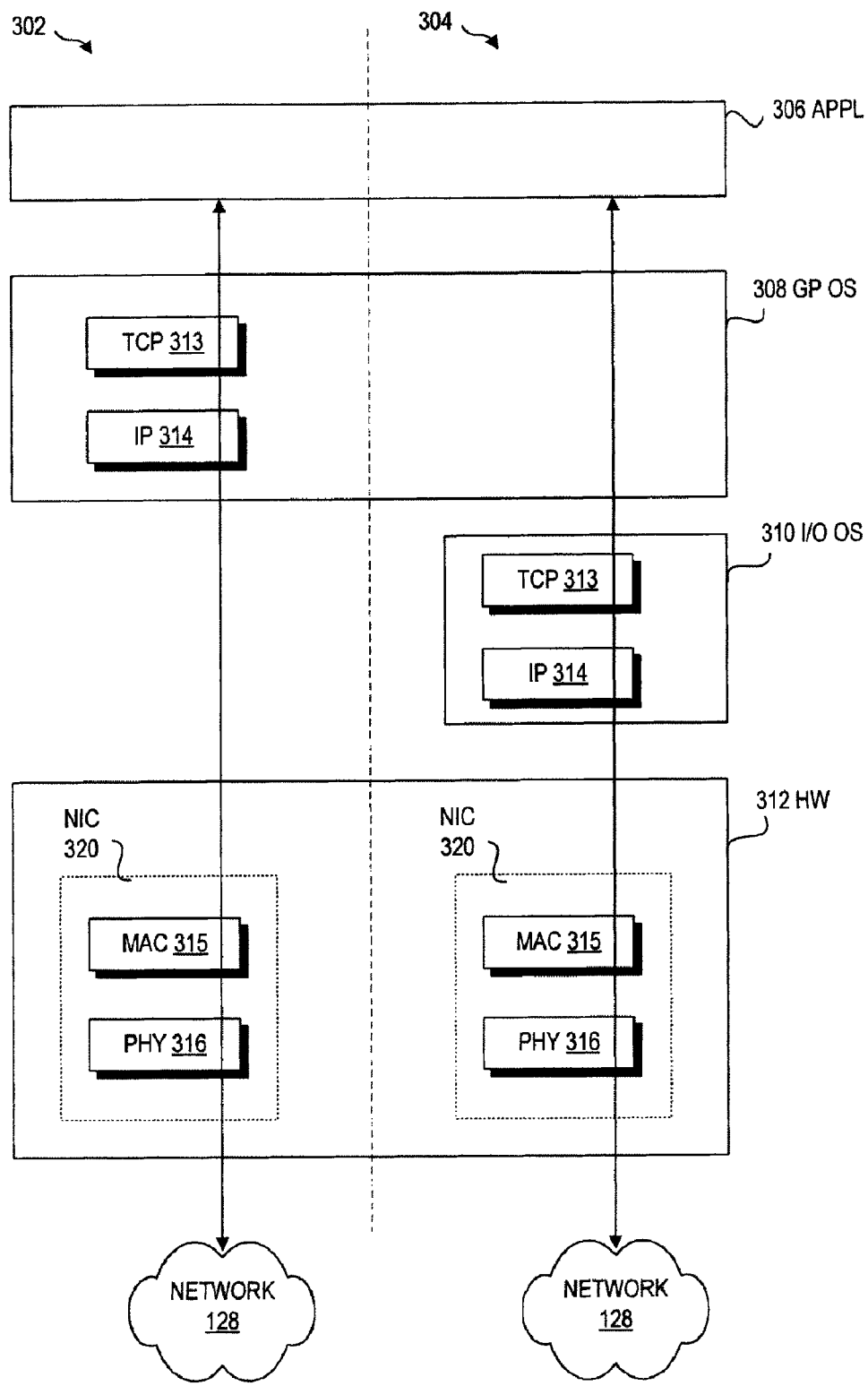
FIG. 3 is a block diagram illustrating a network protocol stack in accordance with one embodiment of the present invention.

Turning to FIG. 3, an embodiment an I/O OS 310 processing a network protocol stack is shown. In FIG. 3, a conventional system design is shown at 302 and an embodiment of the present invention is shown at 304. In FIG. 3, the network protocol stack is a TCP/IP stack. However, it will be appreciated that embodiments of the invention may be implemented with other network protocol stacks such as Novell Netware, AppleTalk, or the like.

In conventional design 302, an application 306, such as an Internet browser, is layered on General Purpose OS 308 which is layered on hardware 312. Hardware 312 includes a Network Interface Card (NIC) 320 for connecting the system to network 128. The TCP/IP stack includes a TCP layer 313, an IP layer 314, a Media Access Control (MAC) layer 315, and a Physical (PHY) layer 316.

In conventional design 302, the TCP and IP layers are processed by General Purpose OS 308 and the MAC and PHY layers are handled by NIC 320. In a system handling a lot of network traffic, processing network protocol stack tasking wastes processing resources. As a general rule in industry, in an Ethernet connection, for every one bit per second (bps) of network data processed, one hertz of processing is needed.

An embodiment of the invention, shown at 304, processing of the network protocol stack is moved out of General Purpose OS 308 and to I/O OS 310. As shown, the TCP and IP layers are processed by I/O OS 310 which interacts with NIC 320 for handling network transactions. In another embodiment, I/O OS 310 works in conjunction with an application supported by I/O OS 310 for processing the network protocol stack. Thus, General Purpose OS 308 is freed to handle other activity. In one embodiment, I/O OS 310 processes all phases of the network protocol stack including opening and closing sockets, connection management, and error handling.

In one embodiment, an OS device driver of General Purpose OS 308 may post a network transaction to shared memory 107B. In one embodiment, this is similar to the operation of memory mapped I/O. I/O OS 310 completes the network transaction and signals General Purpose OS 308 when the transaction is completed. General Purpose OS 308 may then retrieve the completed network transaction from a designated memory address in shared memory 107B.

In one embodiment, the General Purpose OS 308 is unaware of the partition handling the network protocol stack. From the perspective of the GP OS, it is interacting with a hardware device via the OS device driver. As discussed further below, the General Purpose OS only has knowledge of the system resources as passed to the GP OS by the firmware.

Network transactions include activity between a system and a network. Network transactions may involve one-way or two-way communications. Network transactions support such user functions as email, Internet browsing, and uploading/downloading files.

Embodiments of the present invention enhance network protocol stack processing without the expense of a specialized TCP/IP Offload Engine (TOE). A TOE offloads the processing of the TCP/IP protocol stack from a main processor to specialized hardware. The TOE may be embodied in a NIC, a Host Bus Adapter, or other I/O card. TOE's may be implemented as a network processor executing instructions or an Application Specific Integrated Circuit (ASIC).

TOE's usually only work for large, sequential block transfers, so it is hard for customers to amortize thousands of dollars per TOE card for random, small network transactions. With embodiments described herein, TOE behavior may be called upon from a spare processing unit. However, if extra protocol stack processing power is not needed, then the I/O processing units may be reconfigured for General Purpose OS use.

Also, specialized I/O cards, such as TOE cards, take up a slot on the I/O bus, wherein embodiments herein do not. Further, the I/O bus connection to the slot may form a bottleneck for activity between the I/O card and memory. Embodiments of the invention put the I/O processing unit(s) within a high-speed interconnect topology with memory and other processing units supporting the General Purpose OS.

Figure 4:
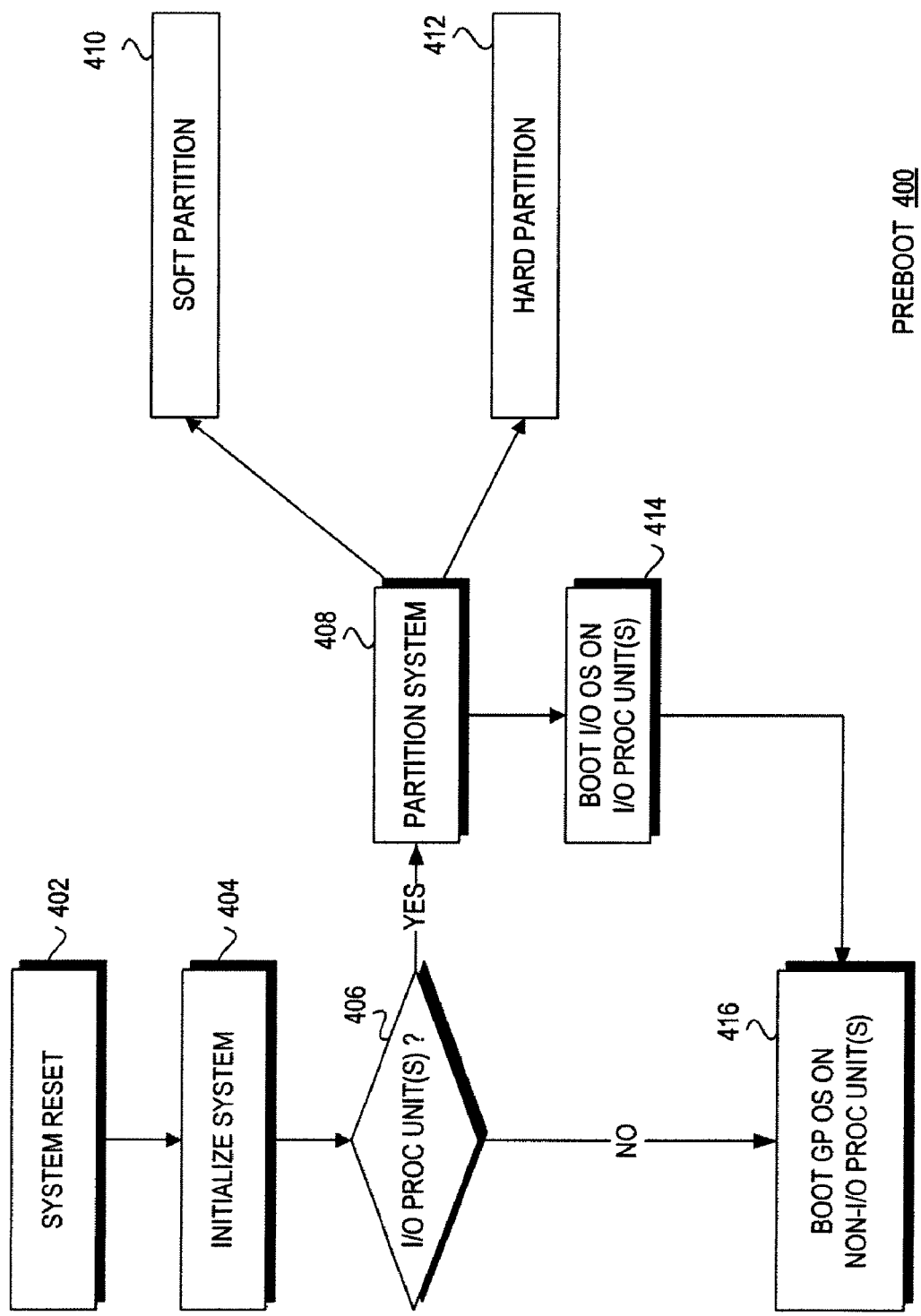
FIG. 4 is a flowchart illustrating the logic and operations to initialize a system during pre-boot in accordance with one embodiment of the present invention.

Turning to FIG. 4, a flowchart 400 to initialize a system during pre-boot in accordance with embodiments herein is shown. In one embodiment, at least a portion of the logic of flowchart 400 is implemented by I/O OS 122 executing on at least one processing unit of computer system 100.

Starting in a block 402, the system is reset. The system reset marks the beginning of the pre-boot phase. In one embodiment, at least a portion of the instructions of system firmware 116 are loaded from NVS storage 114 and executed. In one embodiment, at least one processing unit is designated as the pre-boot processor.

Proceeding to a block 404, the system is initialized. System initialization may include a Power-On Self Test (POST). During system initialization, system firmware 116 may interrogate the system to discover what hardware is present and the hardware capabilities.

Continuing to a decision block 406, the logic determines if any processing units are designated as an I/O processing unit. In one embodiment, the designating of which processing units are to be I/O processing units is coded into the system firmware 116. Since this is part of system firmware 116, the division of processing units between the GP OS and the I/O OS may be changed by revising the system firmware. If the answer to decision block 406 is no, then the logic continues to a block 416 to boot the General Purpose OS on the non-I/O processing units.

If the answer to decision block 406 is yes, then the logic proceeds to a block 408 to partition the system. Partitioning separates the system into different portions that may act as individual systems. As will be described, each partition has its own OS, processing units, memory resources, and link topology. A common memory mapping, such as shared memory 107B, will serve to pass network transactions between the partitions.

In one embodiment, the system is partitioned according to a soft partition 410. In soft partition 410, the amount of system resources are under-reported to the General Purpose OS by system firmware 116. For example, the number of processing units and amount of memory is under-reported. The non-reported resources are reserved for use by the I/O OS. In soft partitioning, system firmware 116 "fools" the General Purpose OS as to the actual configuration of the system. In soft partitioning, the partitions are separated as viewed by the respective operating systems, but are not necessarily separated at the hardware level.

In another embodiment, the system is partitioned according to a hard partition 412. In hard partition 412, system resources are configured such that some of the system resources are inaccessible to the General Purpose OS and the I/O OS. In hard partitioning, processing units and memory is partitioned at the hardware level, such as by the setting of registers, such that the partitions are physically separated.

After block 408, the logic proceeds to a block 414 to boot the I/O OS on the processing unit(s) designated for I/O processing. The logic then continues to block 416 to boot the General Purpose OS on the non-I/O processing units.

Figure 5:
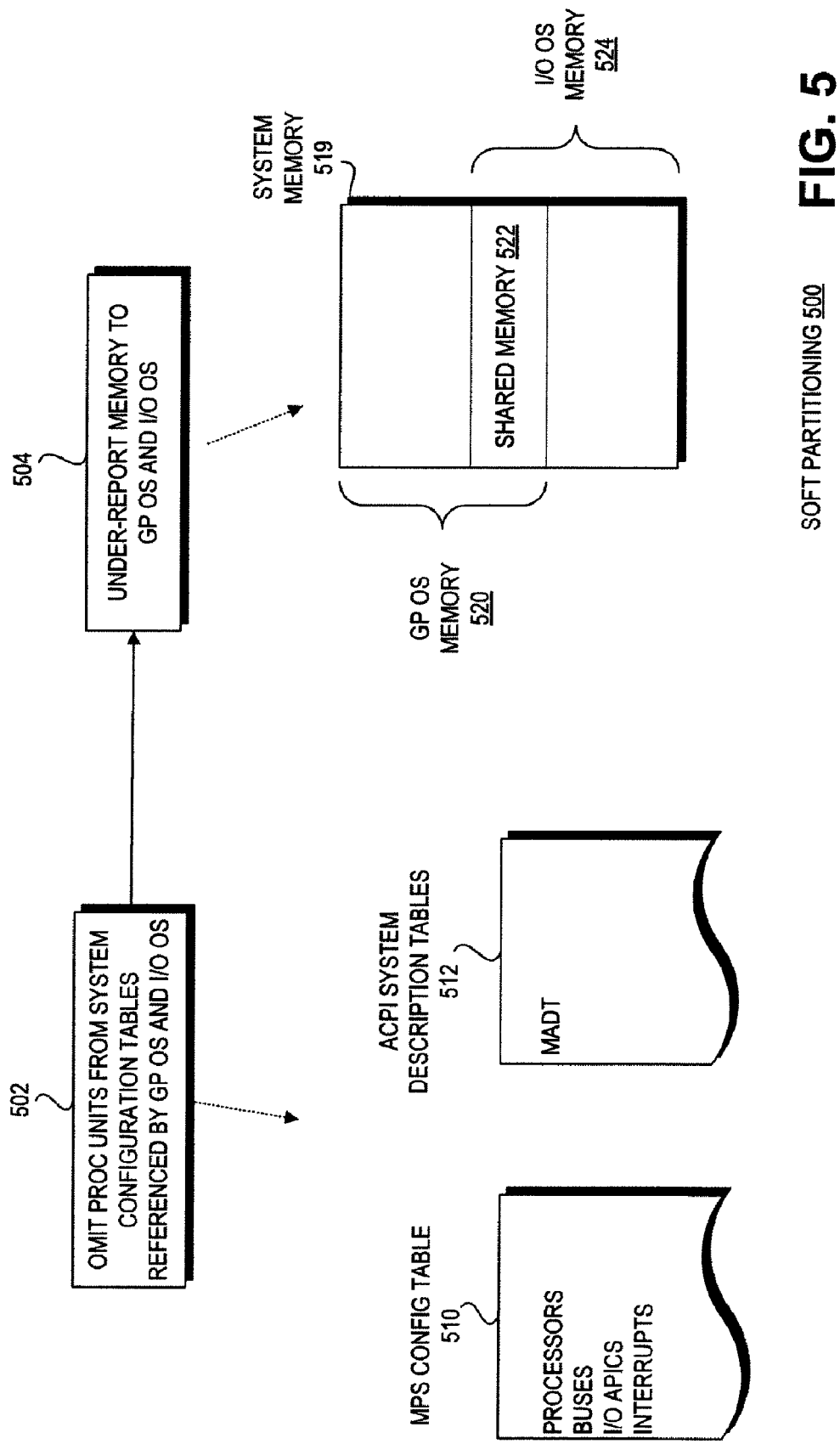
FIG. 5 is a flowchart illustrating the logic and operations to initialize a system during pre-boot in accordance with one embodiment of the present invention.

Turning to FIG. 5, an embodiment of a soft partitioning scheme 500 is shown. Starting in a block 502, the processing units designated for the I/O OS are omitted from system configuration tables that are referenced by the General Purpose OS and the I/O OS. In one embodiment, system firmware 116 constructs such configuration tables during pre-boot.

In one embodiment, a multiprocessor system, such as shown in FIG. 2A, is in compliance with the *Multiprocessor Specification*, Intel® Corporation, version 1.4, May 1997 (hereafter referred to as the "MPS"). The MPS delineates an MP Configuration Table 510 that is used by the General Purpose OS and the I/O OS. During the pre-boot phase, system firmware 116 fills in entries in Table 510 after discovering the system configuration. MP Configuration Table 510 includes entries regarding system processors, buses, Advanced Programmable Interrupt Controllers (APICs), and Interrupts.

In accordance with embodiments herein, the system firmware 116 may construct an MP Configuration Table for use by the General Purpose OS. This MP Configuration Table reports the processors designated for use by the General Purpose OS. Similarly, system firmware 116 reports different processing units for use by the I/O OS. Since system firmware 116 reports the memory location to the respective OS's for the MP Configuration Table, the system firmware 116 may report locations of the MP Configuration Table to the General Purpose OS and I/O OS, accordingly.

In another embodiment of soft partitioning, system firmware 116 constructs Advanced Configuration and Power Interface (ACPI) tables in accordance with the *Advanced Configuration and Power Interface Specification*, revision 2.0b, Oct. 11, 2002. FIG. 5 shows ACPI System Description Tables 512. These tables list devices of the system, such as processing units, and their power management capabilities. Tables 512 enable an OS to control devices without having to know how the controls are implemented. Tables 512 also indicate system power states supported by the system, a description of system power planes, clock capabilities, and battery resources. For example, the ACPI Multiple APIC Description Table (MADT) may be set so that only certain processing units are marked present as referenced by the General Purpose OS. The remaining processing units are marked present as referenced by the I/O OS.

At least a portion of Tables 512 are setup in memory by system firmware 116 during pre-boot. The General Purpose OS and I/O OS refer to the ACPI tables during OS boot and OS runtime. Since system firmware 116 constructs the ACPI System Description Tables 512, system firmware 116 reports system resources, such as processing units, to the General Purpose and I/O OS's.

In a block 504, system firmware 116 partitions system memory 519 between GP OS memory 520 and I/O OS memory 524. An overlapping shared portion is designated shared memory 522. The GP OS and I/O OS are also made aware that shared memory 522 is not for general use, but is reserved for network transactions. In one embodiment, the GP OS may "see" the shared memory 522 as memory mapped I/O for a network interface.

System firmware 116 may under-report the total amount of memory to the General Purpose OS excluding the memory allocated as only for the I/O OS memory. Similarly, system firmware 116 may under-report the total amount of memory to the I/O OS excluding memory allocated as only for the General Purpose OS. The General Purpose OS and the I/O OS construct their memory pages according to the amount of memory reported by system firmware 116. In various embodiments, system firmware 116 may report the amount of available memory by the Int15h E820 system call for conventional BIOS or the GetMemoryMap( ) call for an EFI compliant system.

Figure 6:
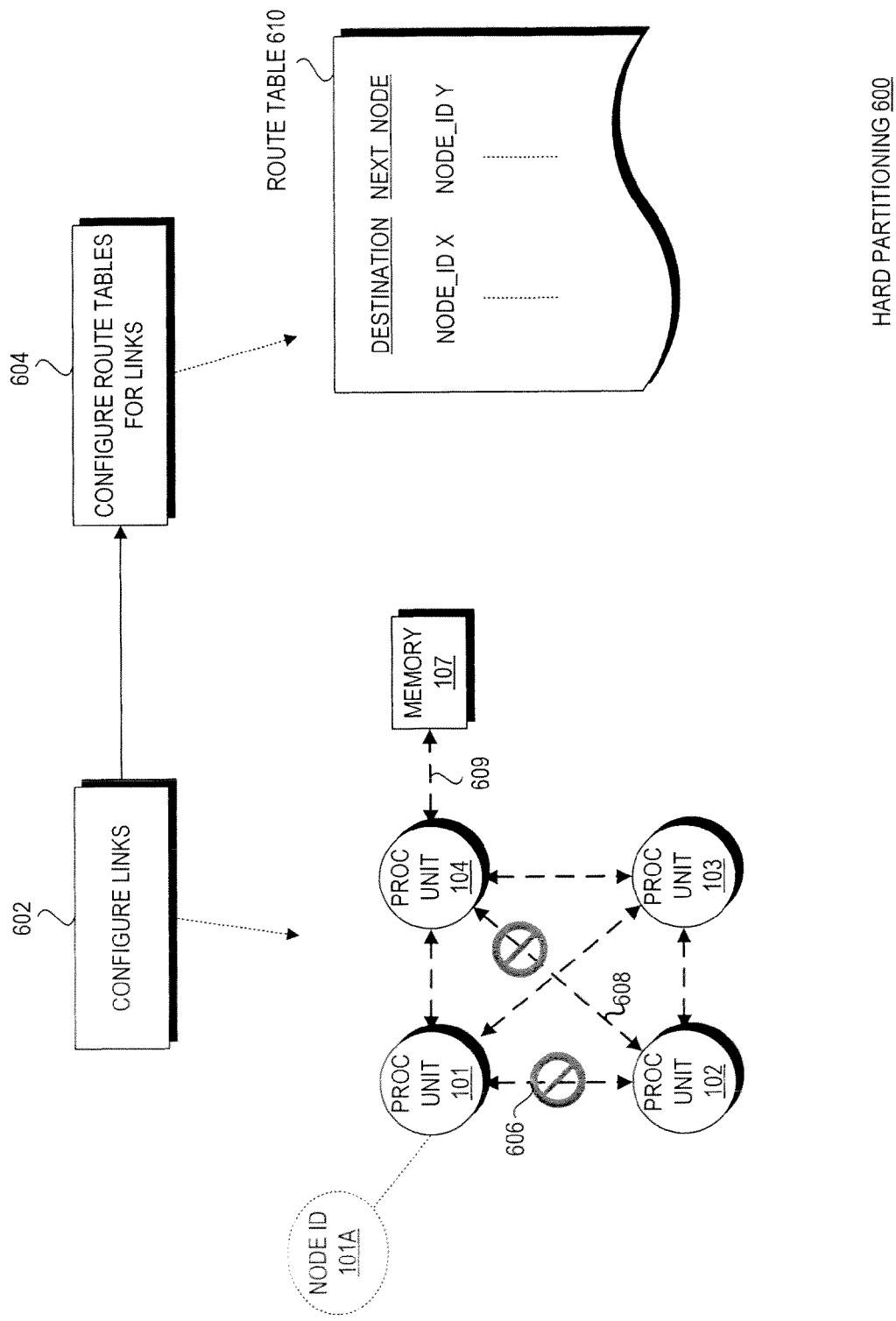
FIG. 6 is a flowchart illustrating the logic and operations to initialize a system during pre-boot in accordance with one embodiment of the present invention.

Referring to FIG. 6, an embodiment of a hard partitioning scheme 600 is shown. In a block 602, the links between processing units are configured during pre-boot. At startup, system firmware 116 may interrogate all the links, establish link widths (e.g., 2 bits, 4 bits, etc.), and link frequencies. Link configuration information may be stored in system registers. In the HyperTransport Technology, these registers are referred to as the Link Configuration registers and the Link Frequency registers (see, *HyperTransport I/O Link Specification*, HyperTransport Technology Consortium, revision 1.10, Aug. 25, 2003).

Also, each end of a link may be referred to as a node and have an associated node identification (node id), such as node id 101A corresponding to processing unit (i.e., node) 101.

Also, in FIG. 6, link 606 between processing units 101 and 102, and link 608 between processing units 102 and 104 are not reported by system firmware 116 to the General Purpose OS 120 and I/O OS 122. Thus, packets may not be transferred between processing unit 101 and processing unit 102 along link 606. Even though link 606 may be physically present, system firmware 116 sets system registers accordingly so that link 606 is not functional.

Proceeding to a block 604, the route tables for the links in each partition are configured. Route tables may also be referred to as "address decoders." When a packet is received at a node, the node refers to a route table, such as route table 610. The node uses the route table to determine the next node to forward the packet to in order for the packet to reach its destination node. Route tables may be constructed for each partition to describe the routing within each partition. In one embodiment, the General Purpose OS and I/O OS do not have to be aware of the link topology and routing in their respective partitions because this is handled at the firmware and/or hardware level.

Referring again to link 606, the route tables at the nodes would not include information for sending packets between processing units 101 and 102 since link 606 has been hard partitioned out of the system.

Also, the route tables may be constructed such that I/O OS memory 107A is not accessible to the General Purpose OS, but shared memory 107B is accessible to the General Purpose OS for conveying network transactions to the I/O OS. Route tables in each partition and the associated routing logic comprehend this partitioning of memory 107.

In some situations, hard partitioning may be more reliable than soft partitioning. For example, in soft partitioning, even though memory 107 is partitioned, a memory overrun of shared memory 107B could overwrite data in I/O OS memory 107A since memory 107A and 107B are only partitioned because the firmware under-reported available memory to the General Purpose OS.

In contrast, in a hard partitioning, a memory overrun may be avoided because I/O OS memory 107A is inaccessible by the General Purpose OS due to hard partitioning. In one embodiment using route tables, access to I/O OS memory by the General Purpose is prohibited because of a lack of routing information to reach the memory of the I/O OS by the GP OS.

It will be appreciated that a partitioning scheme (hard or soft) may be programmed into the system firmware by a system vendor. The system vendor may receive "generic" system boards having multiple processing units. The system vendor may then affect embodiments herein by programming the system firmware as desired.

Also, in accordance with embodiments herein, the General Purpose OS has no knowledge of the partitioning of the system by the firmware. Thus, a General Purpose OS does not have to be modified when used with embodiments herein. A system vendor may load the same General Purpose OS on systems that utilize the offloading of network protocol processing or that do not. Also, the General Purpose OS does not have to be modified to work with different embodiments of the partitioning as described herein.

Further, a customer may change their partitioning setup by revising the system firmware. For example, if a server board is re-deployed to a place in an enterprise network where more processing units are to be sequestered for network protocol stack processing, then system firmware may be revised accordingly. Alternatively, the firmware may be updated to remove the partitioning of a processing unit for network protocol stack processing. Further, the General Purpose OS does not have to be modified to support a firmware revision of the partitioning. Thus, embodiments herein provide a system with a flexible reconfiguration capability.

Figure 7:
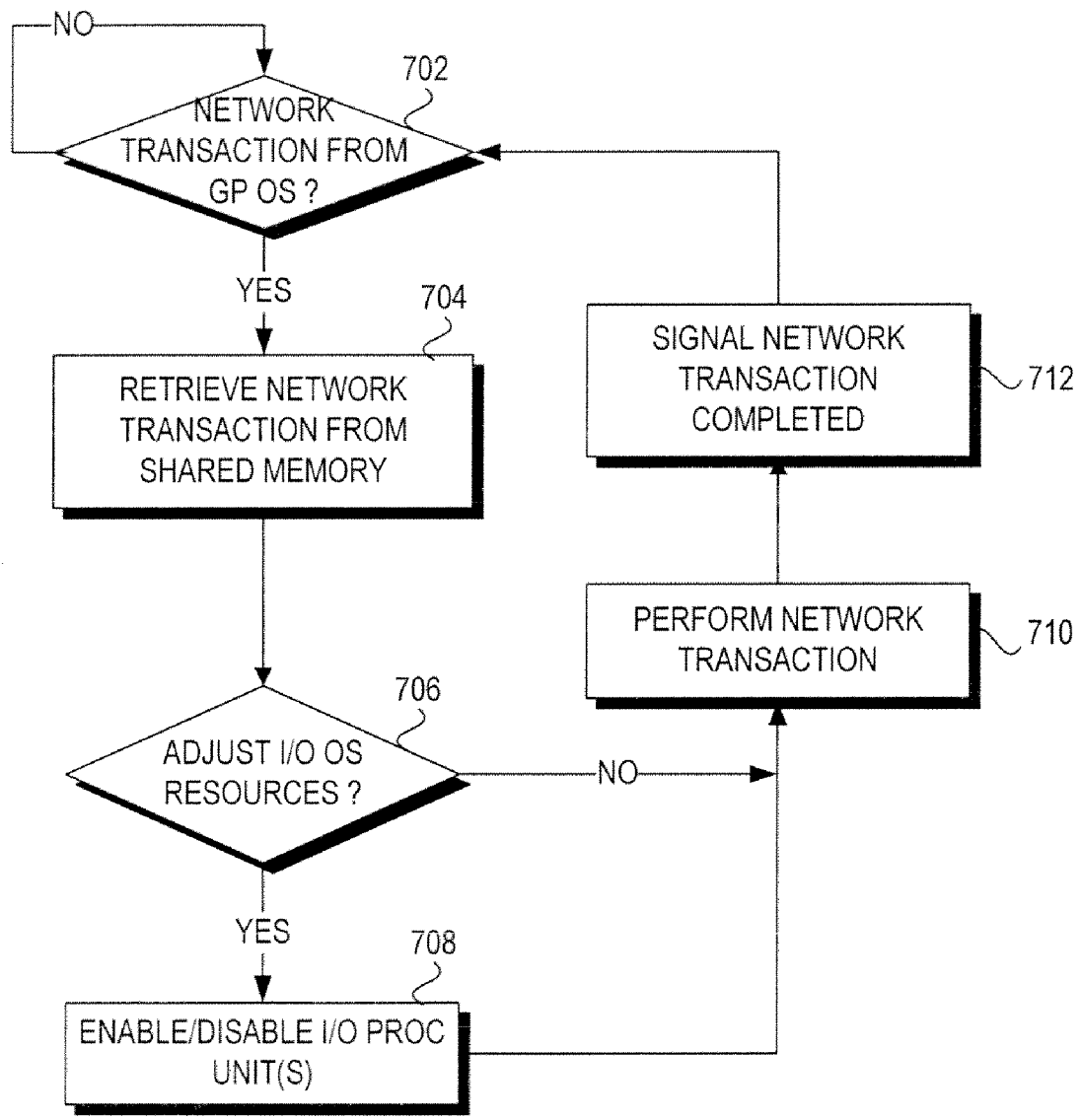
FIG. 7 is a flowchart illustrating the logic and operations to process an I/O request during OS runtime

Turning to FIG. 7, a flowchart 700 for processing a network protocol stack during OS runtime in accordance with an embodiment of the invention is shown. In one embodiment, at least a portion of the logic of flowchart 700 is conducted by I/O OS 122 executing on one or more processing units of computer system 100.

Starting in a decision block 702, the logic determines if a network transaction has been received from the General Purpose OS. If the answer is no, the I/O OS continues waiting. If the answer is yes, then the logic proceeds to a block 704 to retrieve the network transaction from shared memory. The network transaction may be a non-blocking request such that General Purpose OS and its associated processing units may continue with other activity while the I/O OS completes the network transaction.

Figure 8:
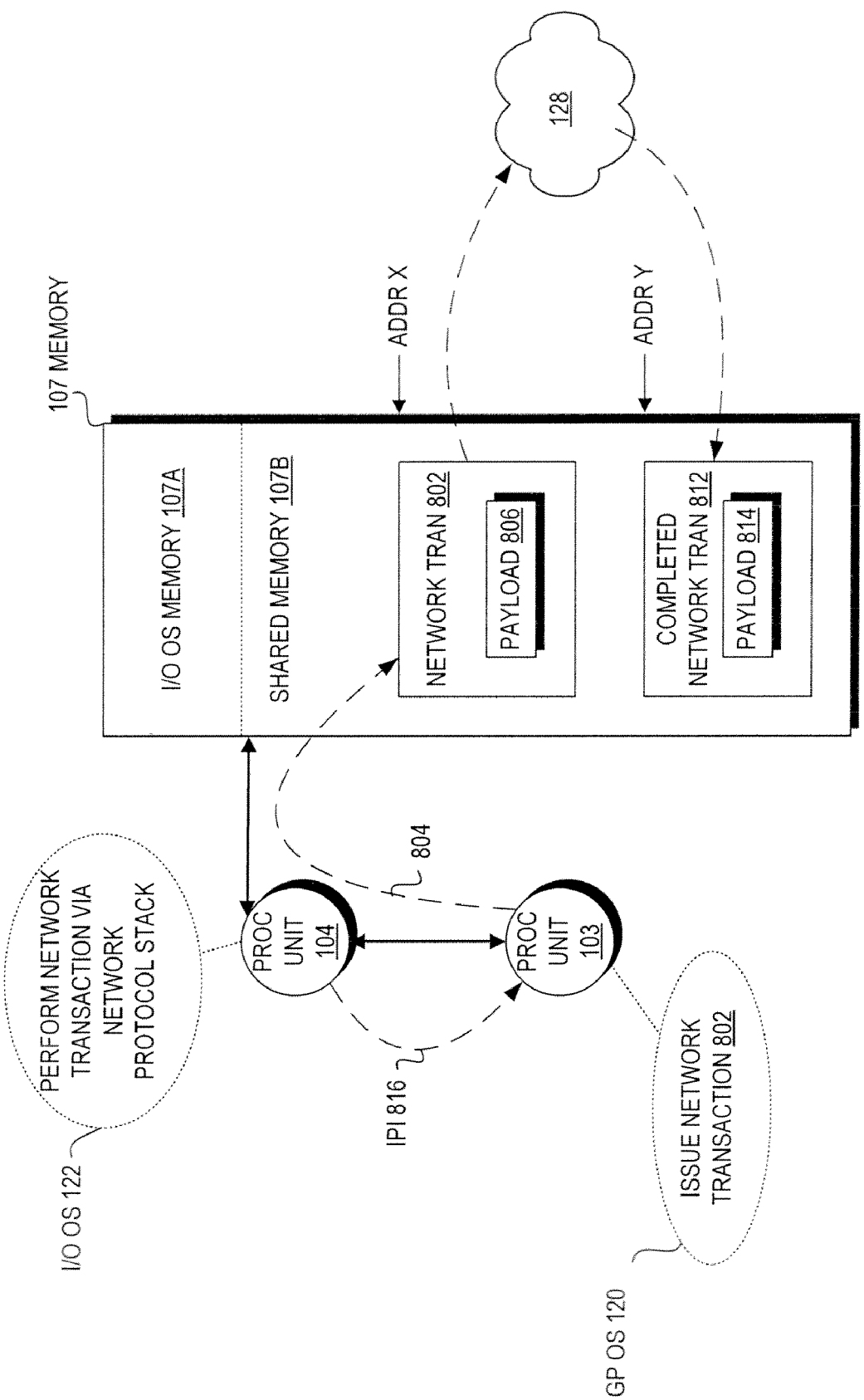
FIG. 8 is a block diagram illustrating the logic and operations to process an I/O request during OS runtime.

For example, an application, such as an email application or an Internet browser, running on the General Purpose OS may issue a network transaction. Referring to FIG. 8, a network transaction 802 has been issued at General Purpose OS 120. Network transaction 802 is posted to a memory address 'X' in shared memory 107B that is monitored by I/O OS 122. Memory address 'X' may serve as a mailbox between General Purpose OS 120 and I/O OS 122. Network transaction 802 may include a payload 806. Payload 806 may include commands and/or data.

Returning to flowchart 700, the logic proceeds to a decision block 706 where the logic determines if an adjustment to I/O OS resources is needed. In one embodiment, the logic determines if processing units designated for the I/O OS are to be brought up or put into a sleep state. In one embodiment, the I/O OS may reference a threshold number of network transactions that are queued for processing in determining if additional processing units are needed. Putting unneeded processing units into a sleep state saves power consumed by computer system 100 as well as reducing the cooling needs of computer system 100.

If the answer to decision block 706 is yes, then the logic proceeds to a block 708 to enable or disable one or more processing units. In one embodiment, management of I/O processing units is conducted by the I/O OS or agent running on the I/O OS. After block 708, then logic continues to a block 710 to perform the network transaction.

If the answer to decision block 706 is no, then the logic proceeds to block 710 to perform the network transaction. As shown in FIG. 8, I/O OS 122 manages interaction with network 128 to perform network transaction 802. I/O OS 122 manages the network protocol stack for the system. If appropriate for network transaction 802, a completed network transaction 812 may be placed in shared memory 107B at address 'Y'. Completed network transaction 812 may include a payload 814.

Returning to FIG. 7, after block 710, the logic proceeds to a block 712 to signal to the General Purpose OS 120 that the network transaction is completed. After block 712, the logic continues to decision block 702. In FIG. 8, processing unit 104 issues an InterProcessor Interrupt (IPI) to processing unit 103 to indicate network transaction 802 has been completed. In an alternative embodiment, General Purpose OS 120 may periodically poll I/O OS 122 asking if network transaction 802 has been completed. When the General Purpose OS receives the completion signal, the General Purpose OS may "pickup" the completed network transaction 812 at memory address 'Y' of shared memory 107B.

Further embodiments of computer system 100 in FIG. 1 will now be discussed. Processing units 101-104 may include, but are not limited to, an Intel® Corporation Pentium®, Xeon®, or Itanium® family processor, or the like. Memory 105-108 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 105-108 may include one or more memory units that do not have to be refreshed.

Computer system 100 may include a memory controller, such as a Memory Controller Hub (MCH), an input/output controller, such as an Input/Output Controller Hub (ICH). In one embodiment, one or more memory controllers for memory 105-108 may reside in the same chip(s) as processing units 101-104. Computer system 100 may also include system clock support, power management support, audio support, graphics support, or the like. Computer system 100 may include an I/O device such as a keyboard, a mouse, a display, a printer, a scanner, or the like.

Components of computer system 100 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like.

Computer system 100 may interface to external systems through network interface(s) 126. Network interface(s) 126 may include, but is not limited to, a modem, a Network Interface Card (NIC), or other interfaces for coupling a computer system to other computer systems. A carrier wave signal may be received/transmitted by network interface(s) 126. In one embodiment, the carrier wave signal may used to interface computer system 100 with network 128. Network 128 may include a Local Area Network (LAN), a Wide Area Network (WAN), the Internet, or any combination thereof. In one embodiment, network 128 is further coupled to another computer system (not shown) such that computer system 100 may communicate with this other computer system over network 128.

Computer system 100 also includes non-volatile storage 114 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

Storage 118 includes, but is not limited to, a magnetic disk drive, a magnetic tape drive, an optical disk drive, or the like. It is appreciated that instructions executable by processing units 101-104 may reside in storage 118, memory 105-108, non-volatile storage 114, or may be transmitted or received via network interface(s) 126.

Embodiments of General Purpose OS 120 include the Microsoft Windows® family of operating systems. Other operating systems that may also be used with computer system 100 include, but are not limited to, the Apple Macintosh operating system, the Linux operating system, the Unix operating system, or the like.

For the purposes of the specification, a machine-accessible medium includes any mechanism that provides (i.e., stores) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
    partitioning a computer system during a pre-boot phase of the computer system between a first partition and a second partition, wherein the first partition to include a first processing unit and a first memory region and the second partition to include a second processing unit and a second memory region, the first and second memory regions partially overlapping to form a shared memory region;
    booting an Input/Output (I/O) operating system on the first partition;
    booting a general purpose operating system on the second partition;
    issuing network transactions by the general purpose operating system to be performed by the I/O operating system by placing network transactions requests in the shared memory region; and
    performing the network transactions by the I/O operating system, wherein a Transmission Control Protocol and Internet Protocol ("TCP/IP") stack of the general purpose operating system is offloaded to the I/O operating system to perform the network transactions of the general purpose operating system by the I/O operating system instead,
    wherein partitioning memory of the computer system includes under-reporting an amount of memory available to the general purpose operating system.

2. The method of claim 1 wherein partitioning the computer system during the pre-boot phase comprises soft partitioning the computer system during the pre-boot phase.

3. The method of claim 2 wherein soft partitioning during the pre-boot phase comprises:
    omitting the first processing unit from a system configuration table of the computer system that is to be referenced by the general purpose operating system, wherein the first processing unit to be used by the I/O operating system,
    wherein non-reported memory is to be used by the I/O operating system.

4. The method of claim 3 wherein the system configuration table includes a Multiprocessor Configuration Table.

5. The method of claim 3 wherein the system configuration table includes an Advanced Configuration and Power Interface (ACPI) Table.

6. The method of claim 1 wherein partitioning the computer system during the pre-boot phase comprises hard partitioning the computer system during the pre-boot phase.

7. The method of claim 6 wherein hard partitioning during the pre-boot phase comprises:
    configuring one or more links of the first partition and one or more links of the second partition; and
    configuring a first route table associated with the one or more links of the first partition and a second route table associated with the one or more links of the second partition.

8. The method of claim 1 wherein performing the network transactions by the I/O operating system comprises:
    retrieving the network transaction requests from the shared memory region;
    processing the network transaction requests using a system network protocol stack; and
    signaling the general purpose operating system that the network transaction requests have been completed.

9. The method of claim 1, further comprising:
    enabling a third processing unit of the computer system for executing the I/O operating system during runtime of the I/O operating system.

10. The method of claim 1, wherein the computer system comprises a multi-core processor, the first processing unit comprises a first core of the multi-core processor, and the second processing unit comprises a second core of the multi-core processor.

11. A non-transitory machine-accessible medium that stores a plurality of instructions which when executed perform operations comprising:
    designating a first processing unit of a computer system, during a pre-boot phase of the computer system, to be used by an Input/Output (I/O) operating system;
    designating a second processing unit of the computer system, during the pre-boot phase, to be used by a general purpose operating system;
    partitioning memory of the computer system, during the pre-boot phase, into a first portion to be used by the I/O operating system and a second portion to be used by the general purpose operating system, wherein the first and second portions include a shared memory portion that is to be accessible to the general purpose operating system and the I/O operating system, wherein partitioning the memory of the computer system includes under-reporting an amount of memory available to the general purpose operating system;
    offloading a network protocol stack of the general purpose operating system to the I/O operating system; and
    issuing network transactions by the general purpose operating system to the I/O operating system by placing network transaction requests in the shared memory portion.

12. The non-transitory machine-accessible medium of claim 11 wherein designating the first processing unit comprises:
    omitting the first processing unit from a configuration table of the computer system that is to be referenced by the general purpose operating system.

13. The non-transitory machine-accessible medium of claim 11 wherein designating the first processing unit comprises;
    configuring one or more links of the computer system to hard partition the first processing unit from the second processing unit; and
    configuring route tables associated with the one or more links.

14. The non-transitory machine-accessible medium of claim 13 wherein configuring the route tables associated with the one or more links comprises:

excluding routes to access the first portion of memory, that is not part of the shared memory portion, by the general purpose operating system; and excluding routes to access the second portion of memory, that is not part of the shared memory portion, by the I/O operating system.

15. A computer system, comprising:

a first processing unit coupled to a first portion of memory;

a second processing unit coupled to a second portion of memory;

an Input/Output Hub coupled to the first and second processing units; and a non-volatile storage unit coupled to the Input/Output Hub, wherein the non-volatile storage unit stores a plurality of instructions which when executed by the first or second processing units perform operations comprising:

designating the first processing unit, during a pre-boot phase of the computer system, to be used by an Input/Output (I/O) operating system to execute a Transmission Control Protocol and Internet Protocol ("TCP/IP") stack for a general purpose operating system;

designating the second processing unit, during the pre-boot phase, to be used by the general purpose operating system; and partitioning the first and second portions of memory, during the pre-boot phase, wherein the first and second portions overlap to include a shared memory portion that is to be accessible to the general purpose operating system and the I/O operating system for issuing network transaction requests by the general purpose operating system to the I/O operating system, wherein partitioning the memory of the computer system includes under-reporting an amount of memory available to the general purpose operating system.

16. The computer system of claim 15 wherein designating the first processing unit comprises:

omitting the first processing unit from a configuration table of the computer system that is to be referenced by the general purpose operating system.

17. The computer system of claim 15 wherein designating the first processing unit comprises:

configuring one or more links of the computer system to hard partition the first processing unit from the second processing unit; and configuring route tables associated with the one or more links.

18. The computer system of claim 17 wherein configuring the route tables associated with the one or more links comprises:

excluding routes to access the first portion of memory, that is not part of the shared memory portion, by the general purpose operating system; and excluding routes to access the second portion of memory, that is not part of the shared memory portion, by the I/O operating system.

19. The computer system of claim 15 wherein the plurality of instructions include system firmware of the computer system.

20. The computer system of claim 15, wherein the first and second processing units comprise cores of a multi-core processor.

21. The computer system of claim 15, wherein the first processing unit comprises a first core of a multi-core processor and the second processing unit comprises a second core of the multi-core processor.

* * * * *